United States Patent
Keller et al.

(10) Patent No.: US 10,209,775 B2
(45) Date of Patent: Feb. 19, 2019

(54) USING A MAGNETIC ACTUATION MECHANISM TO PROVIDE TACTILE FEEDBACK TO A USER INTERACTING WITH A VIRTUAL ENVIRONMENT

(71) Applicant: Facebook Technologies, LLC, Menlo Park, CA (US)

(72) Inventors: Sean Jason Keller, Kirkland, WA (US); Tristan Thomas Trutna, Seattle, WA (US); Garett Andrew Ochs, Seattle, WA (US); Selso Luanava, Woodinville, WA (US); Nicholas Roy Corson, Mukilteo, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/299,258

(22) Filed: Oct. 20, 2016

(65) Prior Publication Data

US 2017/0131771 A1    May 11, 2017

Related U.S. Application Data

(60) Provisional application No. 62/253,087, filed on Nov. 9, 2015.

(51) Int. Cl.
*G06F 3/01* (2006.01)
(52) U.S. Cl.
CPC .............. *G06F 3/016* (2013.01); *G06F 3/012* (2013.01); *G06F 3/014* (2013.01)

(58) Field of Classification Search
CPC .......... G06F 3/016; G06F 3/014; G06F 3/011; A61B 5/1071
See application file for complete search history.

(56) References Cited

U.S. PATENT DOCUMENTS

| | | | | |
|---|---|---|---|---|
| 5,184,319 | A * | 2/1993 | Kramer | G06F 3/011 345/156 |
| 6,110,130 | A * | 8/2000 | Kramer | A61B 5/1071 600/587 |
| 2016/0363997 | A1* | 12/2016 | Black | G06F 3/014 |

* cited by examiner

*Primary Examiner* — Kevin M Nguyen
(74) *Attorney, Agent, or Firm* — Fenwick & West LLP

(57) ABSTRACT

An input interface for a virtual reality (VR) system environment includes one or more actuators that, when activated, prevent movement of the input interface by a user. For example, the input interface has magnetic actuation mechanism preventing movement of certain portions of the input interface when actuated, allowing simulation of interactions with virtual objects in a virtual environment presented by the VR system environment. In one embodiment, the input interface includes one or more magnets on a tendon or other portion of the input interface that moves with a portion of the user's body and one or more additional magnets fixed relative to the input interface. Magnets on the portion of the input interface that moves with the portion of the user's body and the fixed additional magnets act as a soft detent mechanism holding the portion of the user's body in one or more specified positions.

15 Claims, 3 Drawing Sheets

USING A MAGNETIC ACTUATION MECHANISM TO PROVIDE TACTILE FEEDBACK TO A USER INTERACTING WITH A VIRTUAL ENVIRONMENT

CROSS-REFERENCE TO RELATED APPLICATIONS

This application claims the benefit of U.S. Provisional Patent Application 62/253,087, filed on Nov. 9, 2015, which is incorporated by reference in its entirety.

BACKGROUND

The present disclosure generally relates to controls for virtual reality systems, and specifically relates to a control providing tactile feedback to a user interacting with a virtual reality system.

Virtual reality (VR) systems typically provide multiple types of sensory output to a user, such as audio and video data presented by a VR headset and audio system, respectively. By providing different types of sensory output, a VR system provides the user with an illusion that the user is immersed in a virtual world generated by the VR system. Additionally, a VR system may include an input interface, such as a glove, that detects position, acceleration, orientation, and other information associated with a portion of the user's body (e.g., the user's hand) and provides the information as input to the VR system. Based on the input from the input interface based on movement of the user in the real world, the VR system may move a corresponding item in the virtual world (e.g., a hand or other appendage belonging to a character in the virtual world). An input interface also facilitates user interaction with other objects in the virtual world. For example, the VR system allows the user to manipulate virtual objects by touching them, picking them up, and moving them through movement of the input interface. However, conventional VR systems do not provide tactile feedback to users as they interact with virtual objects, which may detract from user interaction with virtual objects presented by the VR system.

SUMMARY

An input interface for a virtual reality (VR) system environment includes one or more actuators that, when activated, prevent movement of the input interface by a user. For example, the input interface is a glove including a magnetic actuation mechanism that prevents movement of the glove when actuated. Preventing movement of the input interface allows the actuators to simulate interactions with virtual objects in a virtual environment presented by the VR system environment (e.g., simulate a user holding or grabbing a virtual object presented via the virtual environment).

In one embodiment, the input interface includes one or more magnets on a tendon or other portion of the input interface that moves with a portion of the user's body and one or more additional magnets fixed relative to the input interface. For example, the input interface is a glove that includes one or more magnets on a tendon that moves with the user's finger as well as one or more additional magnets that are fixed relative to the glove. The magnets on the portion of the input interface that moves with the portion of the user's body and the additional magnets fixed relative to the input interface act as a soft detent mechanism that holds the portion of the user's body in one or more specified positions, simulating certain movements or actions. Additionally, the input interface may include programmable magnets that can be configured to stiffen a portion of the input interface or to attract a portion of the input interface to another portion of the input interface, which may account for changes in stiffness of the input interface when the input interface is in different positions (e.g., changes in stiffness of a glove when the glove is closed) or to attract to account for increasing glove stiffness when the glove is closed.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
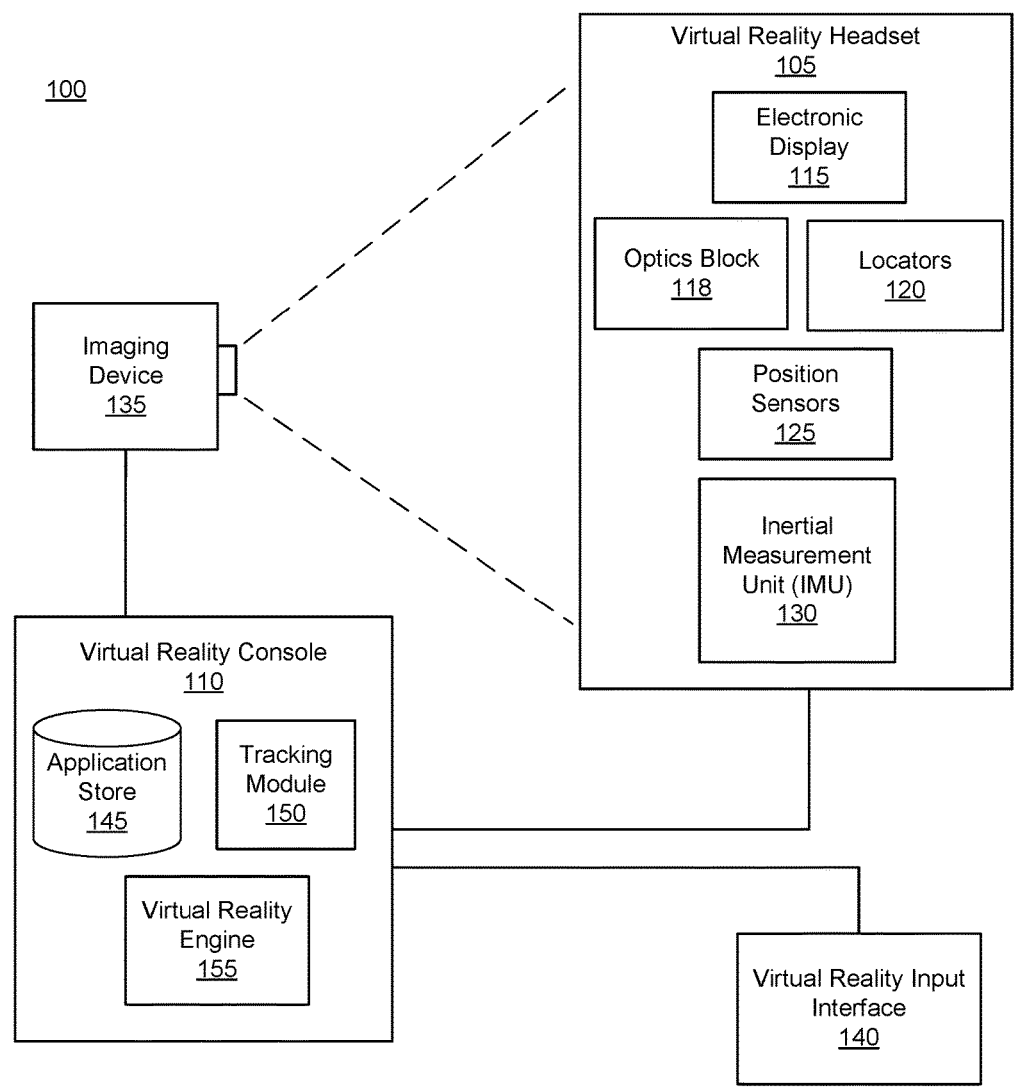
FIG. 1 is a block diagram of a system environment including a virtual reality system environment, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective element 116, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. In embodiments where the sub-pixels are arrayed hexagonally, the corrective element 116 may be configured to generate amounts of blur that causes the array of sub-pixels in the image presented to the user to appear to be arrayed in a rectangular layout.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. Additionally, the optics block 118 may be designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action. In various embodiments, the VR input interface 140 includes one or more controls, which are further described below in conjunction with FIGS. 2 and 3, contacting areas of a user's body and receiving action requests based on movement of one or more areas of the user's body. For example, the VR input interface 140 includes a glove that identifies action requests based on movements of the user's hand and communicates the action request to the VR console 110. A control included in the VR input interface 140 may also provide haptic or other tactile feedback when the VR console 110 performs an action or receives an action request. For example, a control includes one or more actuators that apply pressure, tension, or vibration to an area of the user's body contacting a portion of the control including the actuator. Hence, haptic or tactile feedback produced by the VR input interface 140 allows a user to simulate physical interaction with content presented by the VR headset 105.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 150 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
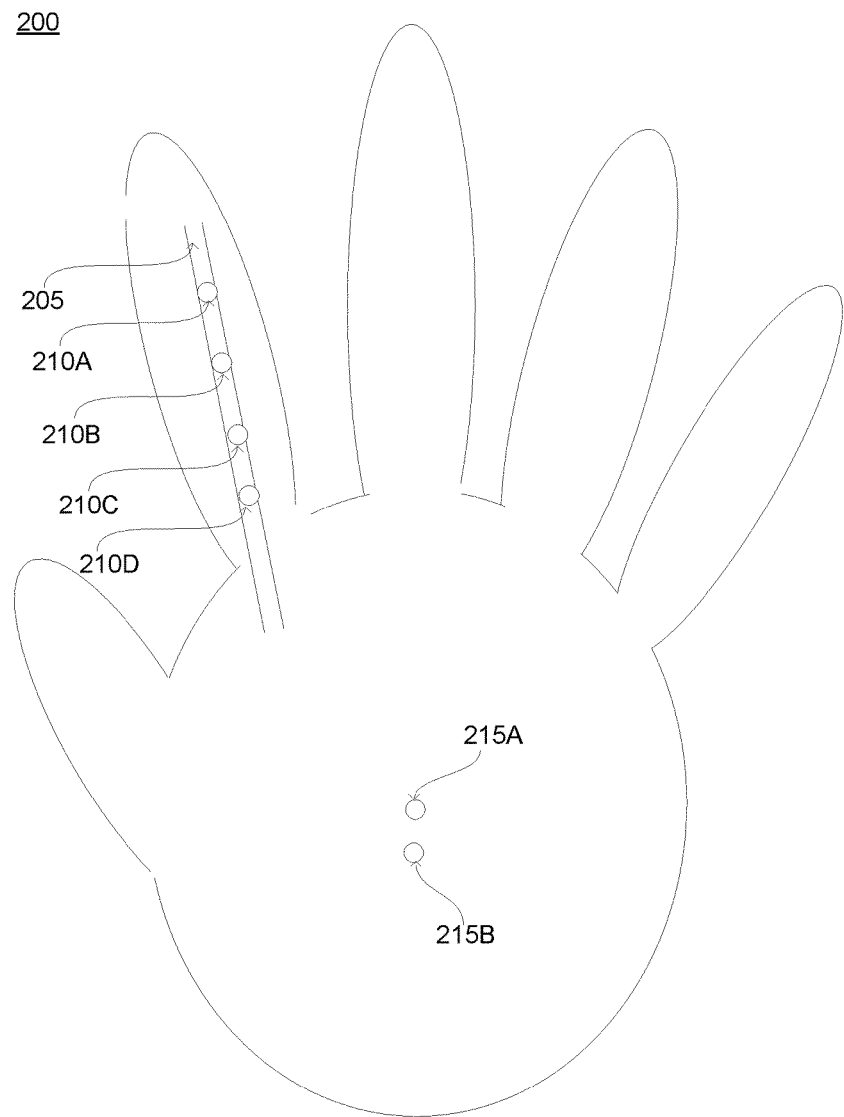
FIG. 2 is a diagram of a glove including a magnetic actuator providing tactile feedback for use in a virtual reality system environment, in accordance with an embodiment.

FIG. 2 is a diagram of a control having a magnetic actuator that is included in a VR input interface 140 of a VR system environment 100. For purposes of illustration, FIG. 2 shows a glove 200 as an example control included in the VR input interface 140. However, in other embodiments, the control may be any suitable article contacting a portion of a user's body. In various embodiments, the glove 200 (or other control) comprises a material (e.g., fabric) or combination of materials having a pattern or shape.

The glove 200 shown in FIG. 2 includes a tendon 205 that comprises is a flexible material (e.g., a braided polymer) capable of moving as a portion of the user's body moves. In the example of FIG. 2, the tendon 205 is included in a portion of the glove 200 covering a user's finger and is configured to move as the user's finger moves. Various magnets 210A, 210B, 210C, 210D (also referred to individually and collectively using reference number 210) are coupled to the tendon 205 or included in the tendon 205. In some embodiments, the magnets 210 may be electromagnets, temporary magnets, permanent magnets, or a combination of types of magnets. Additionally, the glove 200 includes one or more additional magnets 215A, 215B that are fixed relative to the glove 200. In the example of FIG. 2, the additional magnets 215A, 215B (also referred to individually and collectively using reference number 215) remain fixed in a portion of the glove 200 proximate to a center of the user's hand.

If the user's finger moves, the tendon 205 moves with the user's finger. As at least a portion of the tendon 205 moves in a direction towards the additional magnets 215, magnetic repulsion between one or more of the magnets 210 coupled to the tendon 205 and one or more of the additional magnets 215 creates a soft detent mechanism holding the tendon 205 in one or more specified positions, simulating certain movements or actions. For example, magnetic repulsion between one or more of the additional magnets 215 and one or more magnets 210 included on the tendon 205 holds the tendon 205 in a particular position relative to the additional magnets 215, which holds the user's finger in the particular position. Repulsion or attraction between the one or more additional magnets 215 and different magnets 210A-D included on the tendon 205 may hold the tendon 205, and the user's finger, in different positions. In embodiments where the magnets 210 or the additional magnets 215 are electromagnets, the magnets 210 or the additional magnets 215 may be activated based on instructions from the VR console 110, allowing the tendon 205 to be fixed in different positions, which fixes the position of the user's finger, based on activation of the magnets 210 or of the additional magnets 215. Additionally, activating the magnets 210 or the additional magnets 215 may allow modification of the rigidity with which the tendon in fixed in a position. For example, changing strength of a magnet 210 or of an additional magnet 215 may allow the tendon 205 to move a threshold amount, permitting a limited range of motion for the portion of the user's body contacting the tendon 205.

Figure 3:
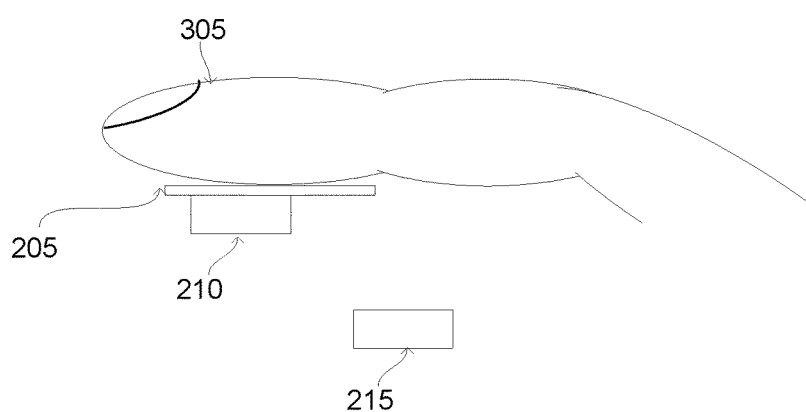
FIG. 3 is a side view of a control for a virtual reality system environment having a magnetic actuator providing tactile feedback, in accordance with an embodiment.

FIG. 3 is a side view of one embodiment of a control having a magnetic actuator that is included in a VR input interface 140 of a VR system environment 100. In the example of FIG. 3, the control comprises a tendon 205, a magnet 210 coupled to the tendon 205, and an additional magnet having a fixed location relative to the control. For purposes of illustration, FIG. 3 shows the tendon 205 contacting a user's finger 305, however, in other embodiments, the tendon 205 may contact any suitable portion of a user's body. As the user's finger 305 moves, the tendon 205 also moves, causing the magnet 210 to move along with the tendon 205, while the additional magnet 215 remains in a fixed location relative to the control.

In some embodiments, movement of the control in certain directions may cause the control to become stiffer, making movement of a portion of the user's body (e.g., the user's finger 305 in FIG. 3) more difficult. To simplify movement of the portion of the user's body, the magnet 210 or the additional magnet 215 may be an electromagnet that is activated to cause attraction between the magnet 210 and the additional magnet 215. This attraction between the magnet 210 and the additional magnet 215 may compensate for increasing stiffness of the control, allowing the user to more easily move the portion of the user's body. In some embodiments, the VR console 110 maintains instructions mapping different stiffnesses of the control to different magnetic field strengths for the magnet 210 or for the additional magnet 215. In some embodiments, as the stiffness of the control increases, the magnetic field strength of the magnet 210 or of the additional magnet 215 also increases to increase attraction between the magnet 210 and the additional magnet 215 as the control becomes stiffer. The stiffness of the control may be determined relative to a position of a portion of the control relative to a reference point (e.g., a displacement or an angle between a portion of the control and a resting position or a resting orientation of the control). Alternatively, as further discussed above in conjunction with FIG. 2, the magnet 210 and the additional magnet 215 may also act as detents to fix the tendon 210 in certain positions, which fixes the user's finger 305 in certain positions in the example of FIG. 3.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A system comprising
a console coupled to an electronic display in a head mounted display, the console configured to provide content to the electronic display for presentation to a user; and
an input control comprising:
a glove configured to be worn on a hand of the user and coupled to the console, the glove including at least one joint portion configured to contain a joint of a finger of the hand of the user, the glove including a tendon extending across the joint portion of the glove, one or more magnets coupled to the tendon along a length of the tendon, the one or more magnets comprising electromagnets configured to be activated in response to receiving an instruction from the console, a strength of a magnetic field of an activated magnet specified by the instruction from the console based on a position of the finger of the hand of the user inserted into the glove relative to a reference position; and
one or more additional magnets fixed relative to the glove and oriented so magnetic fields from one or more magnets and from at least one or more of the additional magnets restrict movement of the tendon of the glove in a direction.

2. The system of claim 1, wherein the strength of the magnetic field of the activated electromagnet determines a range of motion of the tendon in the direction.

3. The system of claim 1, wherein the one or more additional magnets comprise electromagnets.

4. The system of claim 3, wherein one or more of the additional magnets are activated based on instructions received from the console.

5. The system of claim 4, wherein a strength of a magnetic field of an activated additional magnet is based on the instructions received from the console.

6. The system of claim 5, wherein the strength of the magnetic field of the activated additional magnet determines a range of motion of the tendon in the direction.

7. The system of claim 1, wherein the one or more additional magnets are fixed in positions relative to the glove so magnetic fields from the one or more additional magnets and from the one or more magnets hold the tendon in a position.

8. The system of claim 1, wherein a set of the additional magnets have fixed positions relative to the glove and are oriented so magnetic fields from the one or more magnets and from at least one or more magnets of the set additional magnets attract one or more of the magnets to allow movement of the tendon in another direction.

9. A system comprising:
a console coupled to an electronic display in a head mounted display, the console configured to provide content to the electronic display for presentation to a user; and
an input control comprising:
a tendon configured to contact a finger of a hand of the user and to extend across a joint of the finger of the hand of the user;
one or more programmable magnets coupled to the tendon along a length of the tendon, the one or more programmable magnets comprising electromagnets configured to be activated in response to receiving an instruction from the console, a strength of a magnetic field of an activated magnet specified by the instruction from the console based on a position of the finger of the hand of the user contacted by the tendon relative to a reference position; and
one or more additional magnets fixed relative to the tendon and oriented so magnetic fields from one or more magnets and from at least one or more of the additional magnets alters movement of the tendon in a direction.

10. The system of claim 9, wherein the one or more programmable magnets are activated so magnetic fields from the one or more programmable magnets and from at least a set of the one or more additional programmable magnets restrict movement of the tendon in the direction.

11. The system of claim 9, wherein the one or mote programmable magnets are activated so magnetic fields from the one or more programmable magnets and from at least a set of the one or more additional programmable magnets assist movement of the tendon in the direction.

12. The system of claim 9, wherein the one or more additional programmable magnets are activated based on instructions received from the console.

13. The system of claim 12, wherein the one or more additional programmable magnets are activated so magnetic fields from at least a set of the one or more programmable magnets and from the one or more additional programmable magnets restrict movement of the tendon in the direction.

14. The system of claim 12, wherein the one or more additional programmable magnets are activated so magnetic fields from at least a set of the one or more programmable magnets and from the one or more additional programmable magnets assist movement of the tendon in the direction.

15. The system of claim 12, wherein a strength of a magnetic field of an additional programmable magnet is based on the instructions received from the console.

* * * * *

UNITED STATES PATENT AND TRADEMARK OFFICE
CERTIFICATE OF CORRECTION

PATENT NO. : 10,209,775 B2
APPLICATION NO. : 15/299258
DATED : February 19, 2019
INVENTOR(S) : Sean Jason Keller et al.

It is certified that error appears in the above-identified patent and that said Letters Patent is hereby corrected as shown below:

In the Claims

Column 10, Claim 11, Line 1, delete "one or mote" and insert -- one or more --.

Signed and Sealed this
Ninth Day of July, 2019

Andrei Iancu
*Director of the United States Patent and Trademark Office*